US008533516B2

(12) United States Patent
Eliezer et al.

(10) Patent No.: US 8,533,516 B2
(45) Date of Patent: Sep. 10, 2013

(54) LOW POWER RADIO CONTROLLED CLOCK INCORPORATING INDEPENDENT TIMING CORRECTIONS

(75) Inventors: Oren E. Eliezer, Plano, TX (US); Aditya Awasthi, Richardson, TX (US)

(73) Assignee: XW LLC, Dallas, TX (US)

( * ) Notice: Subject to any disclaimer, the term of this patent is extended or adjusted under 35 U.S.C. 154(b) by 223 days.

(21) Appl. No.: 13/240,615

(22) Filed: Sep. 22, 2011

(65) Prior Publication Data
US 2012/0082008 A1 Apr. 5, 2012

Related U.S. Application Data

(60) Provisional application No. 61/385,167, filed on Sep. 22, 2010.

(51) Int. Cl.
*G06F 1/12* (2006.01)

(52) U.S. Cl.
USPC ............................................ 713/400; 368/47

(58) Field of Classification Search
USPC .............. 713/400–401; 375/238; 368/46–47
See application file for complete search history.

(56) References Cited

U.S. PATENT DOCUMENTS

| | | | |
|---|---|---|---|
| 3,406,343 | A | 10/1968 | Mehlman |
| 3,648,173 | A | 3/1972 | Elliott |
| 4,117,661 | A | 10/1978 | Bryant, Jr. |
| 4,217,467 | A | 8/1980 | Kobayashi et al. |
| 4,500,985 | A | 2/1985 | Chang |
| 4,525,685 | A | 6/1985 | Hesselberth et al. |
| 4,562,424 | A | 12/1985 | Takagi et al. |
| 4,768,178 | A | 8/1988 | Conklin et al. |
| 4,925,299 | A | 5/1990 | Meisberger et al. |
| 5,805,647 | A | 9/1998 | Schafer et al. |
| 6,041,082 | A | 3/2000 | Takeda et al. |
| 6,124,960 | A | 9/2000 | Garthe et al. |
| 6,212,133 | B1 | 4/2001 | McCoy et al. |
| 6,295,442 | B1 | 9/2001 | Camp, Jr. et al. |
| 6,862,317 | B1 | 3/2005 | Mohan et al. |
| 6,937,668 | B2 | 8/2005 | Sridharan et al. |
| 7,027,773 | B1 | 4/2006 | McMillin |
| 7,215,600 | B1 | 5/2007 | DeRosa |
| 7,324,615 | B2 | 1/2008 | Lourens et al. |
| 7,411,870 | B2 | 8/2008 | Murata et al. |

(Continued)

OTHER PUBLICATIONS

Hetzel, P., Time Dissemination via the LF Transmitter DCF77 using a Pseudo-Random Phase-Shift Keying of the Carrier, 2nd EP Freq & Time Forum, Session TF-05, No. 3, Mar. 16, 1988.
Lombardi, Michael A., NIST Time and Frequency Services, NIST Special Publication 432, Jan. 2002 Edition.
Lombardi, Michael A. et al., WWVB Radio Controlled Clocks: Recommended Practices, Special Publication 960-14, 2009 Edition.

(Continued)

*Primary Examiner* — Clifford Knoll
(74) *Attorney, Agent, or Firm* — Woods Oviatt Gilman LLP; Howard Zaretsky, Esq.

(57) ABSTRACT

A timekeeping device that tracks the time provided by a digital broadcast and the protocol of that broadcast, defined by its data frame structure and modulation scheme, are adapted to allow for superior performance of the timekeeping devices in terms of range of operation, immunity to interference, ability to operate with lower cost antennas due to enhanced link robustness, and reduced energy consumption. The timekeeping device operates with infrequent receptions of the broadcast by relying on independent self-compensation. This alleviates the need for frequent receptions to ensure timing accuracy while reducing energy consumption. The mean and variability of successive measurements of timing drift are evaluated and an estimated upper bound for the drift-estimation error is set. Based on this bound, the device employs a reception strategy that relies on less frequent receptions, corresponding to the error in estimating the drift rather than to the magnitude of the drift itself.

42 Claims, 7 Drawing Sheets

(56) References Cited

U.S. PATENT DOCUMENTS

| | | | |
|---|---|---|---|
| 7,636,397 | B2 | 12/2009 | McLaughlin |
| 7,719,928 | B2 | 5/2010 | Meltzer et al. |
| 7,720,452 | B2 | 5/2010 | Miyahara et al. |
| 7,738,322 | B2 | 6/2010 | Murata et al. |
| 7,750,612 | B2 | 7/2010 | Yokosawa |
| 7,956,778 | B2 | 6/2011 | Koyama |
| 7,974,580 | B2 | 7/2011 | Fagg |
| 8,300,687 | B1 | 10/2012 | Eliezer |
| 2003/0169641 | A1 | 9/2003 | O'Neill et al. |
| 2004/0196926 | A1 | 10/2004 | Chien et al. |
| 2004/0239415 | A1 | 12/2004 | Bishop |
| 2005/0036514 | A1 | 2/2005 | Polonio et al. |
| 2005/0073911 | A1 | 4/2005 | Barnett |
| 2005/0105399 | A1 | 5/2005 | Strumpf et al. |
| 2005/0111530 | A1 | 5/2005 | Chen et al. |
| 2005/0141648 | A1 | 6/2005 | Lourens et al. |
| 2005/0169230 | A1 | 8/2005 | Haefner |
| 2005/0175039 | A1 | 8/2005 | Haefner et al. |
| 2005/0213433 | A1 | 9/2005 | Mah |
| 2006/0140282 | A1 | 6/2006 | Kondo |
| 2007/0089022 | A1 | 4/2007 | McLaughlin |
| 2007/0115759 | A1 | 5/2007 | Sano |
| 2007/0140064 | A1 | 6/2007 | Fujisawa |
| 2007/0164903 | A1 | 7/2007 | Takada |
| 2008/0049558 | A1 | 2/2008 | Shimizu |
| 2008/0095290 | A1 | 4/2008 | Leung |
| 2008/0107210 | A1 | 5/2008 | Haefner |
| 2008/0239879 | A1 | 10/2008 | Someya |
| 2009/0016171 | A1 | 1/2009 | Fujisawa |
| 2009/0054075 | A1 | 2/2009 | Joergen et al. |
| 2009/0122927 | A1 | 5/2009 | Walton et al. |
| 2009/0254572 | A1 | 10/2009 | Redlich et al. |
| 2009/0274011 | A1 | 11/2009 | Fujisawa |
| 2011/0051561 | A1 | 3/2011 | Fujisawa |
| 2011/0084777 | A1 | 4/2011 | Wilhelm |
| 2011/0129099 | A1 | 6/2011 | Fagg |

OTHER PUBLICATIONS

Lowe, John, We Help Move Time Through the Air, RadioWorld, vol. 35, No. 8, Mar. 23, 2011.

Tele Distribution Francaise, http://en.wikipedia.org/Tele_Distribution_Francaise.

DCF77, http://en.wikipedia.org/wiki/DCF77#Phase_modulation.

WWVB, http://en.wikipedia.org/wiki/WWVB.

US Dept of Commerce, NIST, FY 2010 Small Business Innovation Research Program Solicitation, NIST-10-SBIR, Oct. 30, 2009-Jan. 22, 2010.

Allen, K.C., Analysis of Use of 10 or 20 dB Amplitude Shifting for WWVB at 60 kHz, National Telecommunication & Information Administration, Apr. 25, 2005.

Deutch, Matthew et al., WWVB Improvements: New Power from an Old Timer, 31st Annual Precise Time and Time Interval (PTTI) Meeting, Dec. 7-9, 1999.

Piester, D. et al., PTB's Time and Frequency Activities in 2006: New DCF77 Electronics, New NTP Servers, and Calibration Activities, Proc. 38th Annual PTTI Mtg, Dec. 5-7, 2006.

Bauch, A. et al., PTBM, Special Topic—50 Years of Time Dissemination with DCF77, Special Issue, vol. 119 (2009), No. 3.

Lombardi, Michael A., Radio Controlled Clocks, NIST Time and Frequency Division, NCSL International Workshop and Symposium, 2003.

Chen, Yin et al., Ultra-Low Power Time Synchronization Using Passive Radio Receivers, IPSN '11, Apr. 12-14, 2011.

Lowe, J. et al., Increasing the Modulation Depth of the WWVB Time Code to Improve the Performance of Radio Controlled Clocks, Int'l Freq Control Symp & Expo, IEEE, Jun. 2006.

Lichtenecker, R. "Terrestrial time signal dissemination", Real-Time Systems, 12, pp. 41-61, Kluwer Academic Publishers, Boston MA, 1997.

Cherenkov, G.T. "Employment of phase modulation to transmit standard signals", Plenum Publishing Corporation, 1984.

PCT International Search Report and Written Opinion, PCT/US2012/049029, Dec. 26, 2012.

FIG.6C ns in a month.
LOW POWER RADIO CONTROLLED CLOCK INCORPORATING INDEPENDENT TIMING CORRECTIONS

REFERENCE TO PRIORITY APPLICATION

This application claims priority to U.S. Provisional Application Ser. No. 61/385,167, filed Sep. 22, 2010, entitled "A Reduced-Cost Enhanced-Performance System for Broadcasting and Receiving an Atomic Clock Timing Signal," incorporated herein by reference in its entirety.

FIELD OF THE INVENTION

The present invention relates to the field of wireless communications, and more particularly relates to a timekeeping device capable of compensating for its inherent inaccuracy by synchronizing with a wirelessly received signal in a power-efficient and reliable manner.

BACKGROUND OF THE INVENTION

A radio-controlled-clock (RCC) is a timekeeping device that provides the user with accurate timing information that is derived from a received signal, which is broadcast from a central location, to allow multiple users to be aligned or synchronized in time. Colloquially, these are often referred to as "atomic clocks" due to the nature of the source used to derive the timing at the broadcasting side. In the United States, the National Institute of Standards and Technology (NIST) provides such broadcast in the form of a low-frequency (60 kHz) digitally-modulated signal that is transmitted at high power from radio station WWVB in Fort Collins, Colo. The information encoded in this broadcast includes the official time of the United States. This also includes information regarding the timing of the implementation of daylight saving time (DST), which has changed in the United States over the years due to various considerations.

Similar services operating at low frequencies exist in other regions worldwide, including Europe and Japan. Many consumer-market products exist, including watches, alarm clocks and wall clocks, that are capable of receiving one or more of these broadcasts, and can display the correct time to within about one second of accuracy. While the broadcast may be active continuously, a typical radio-controlled clock may be set to receive the broadcast only once a day. Such reception, if successful (depending on the condition of the wireless link and potential interference), is typically used to reset the timekeeping device, such that if it were set incorrectly or has drifted away from the correct time, it will be set in accordance to the time communicated in the broadcast signal. Naturally, more infrequent reception of this signal, e.g., performed only once a week rather than daily may result in greater timing drifts that would be experienced in the timekeeping device This would, however, allow for energy savings, which may be crucial in a battery-operated device.

The natural drift that could be experienced in a timekeeping device, such as a wrist-watch, with respect to the accurate atomic source, which is used for the official timekeeping and broadcast, would depend on the characteristics of its frequency source, typically being based on a crystal oscillator. A common crystal that is used in such devices is one tuned to 32.768 kHz, for which a division by $2^{15}$ provides a rate of 1 Hz or one pulse per second. These widely available low-cost crystals, however, may experience inaccuracies that range from a few parts per million (ppm) to ±20 ppm, depending on aging effects and the temperature range in which they operate.

For example, an uncompensated timekeeping device, whose crystal resonates at 10 ppm above the nominal 32.768 kHz, will accumulate a timing drift of about 26 seconds ahead of the actual time in the course of a month, since there are about 2.6 million seconds in a month.

One purpose of the reception of the broadcast in these devices is to ensure that such drifts are compensated for before they become intolerable, although existing consumer-products do not allow for the user to specify the tolerable time-drift and it is assumed to be on the order of one second.

A second purpose for the reception of this broadcast is to ensure that the correct state of DST is assumed in the device at all times. For example, if a timekeeping device were to assume that at 2 AM in the morning of the last Sunday in October the time is to be shifted back to 1 AM, in accordance with the historical schedule for this transition, whereas the more recently instated schedule for that DST transition is 2 AM on the first Sunday of November, then the time in the device would be incorrectly set to one hour behind the actual time for a whole week. By receiving the information regarding the actual schedule for the DST transitions from this broadcast, e.g., a month ahead of time, the correctness of the time that is set in the timekeeping device can be ensured without having to receive the broadcast on the day the DST transition is to be applied.

SUMMARY OF THE INVENTION

The present invention provides a novel and useful system and method for compensating for the natural drift that is experienced in a radio-controlled clock (RCC) type of timekeeping device as a result of its inherent inaccuracy and for applying the daylight saving time (DST) time-shift correction of one hour at the appropriate instance. The invention allows the RCC to operate at greatly reduced duty-cycles in order to minimize the energy associated with wireless reception. This is advantageous primarily in battery-operated devices, such as wrist watches, where excessive duty-cycles of operation of the receiver circuitry might intolerably shorten the battery life.

The system of the present invention is partitioned into two entities which allow the device's timekeeping functionality to be accurate, reliable and power efficient. These include (1) the novel communication protocol, according to which the broadcast signal encodes and modulates the information, and (2) the structure and method of operation of the receiver. The communication protocol of the present invention is adapted to allow prior-art devices to operate in accordance with the legacy communication protocol such that they are unaffected by the changes introduced to the protocol by the present invention, whereas devices adapted to operate in accordance with the present invention benefit from various performance advantages. These advantages include (1) greater robustness of the communication link, (2) allowing reliable operation at a much lower signal to interference and noise ratio (SINR), (3) greater reliability in providing the correct time, and (4) reduced energy consumption, which leads to extended battery life in battery-operated devices.

In accordance with one embodiment of the present invention, the modulation applied to the carrier is limited to its phase, thereby allowing existing devices that operate in accordance with the legacy communication protocol, whereby the information may be extracted through envelope detection, to continue to operate with the modified protocol without being affected. Although this backward compatibility property of the communication protocol of the present invention may represent a practical need when upgrading an existing system, the scope of the invention is not limited to the use of this modulation scheme and to operation in conjunction with an existing communication protocol.

The enhanced robustness offered by the present invention, resulting in reliable reception at lower SINR values with respect to those required for proper operation of prior art devices, is a result of the use of (1) a known barker code having good autocorrelation properties, (2) coding that allows for error detection and correction within the fields of information bits that are part of each data frame, and (3) a superior modulation scheme, which is binary-phase-shift-keying (BPSK) in one embodiment of the present invention. The BPSK modulation, representing an antipodal system, is known to offer the largest distance in the signal space with respect to the signal's power, whereas the historical modulation schemes that are used for time broadcasting worldwide are based on pulse-width modulation that relies on amplitude demodulation, requiring a higher SINR to achieve the same decision error probability or bit-error-rate (BER).

The enhanced reliability in assuming or setting the right time in a device of the present invention is achieved through the use of a time-computing procedure that considers not only the information extracted from the received frame, but also the time that has been assumed in the timekeeping device. For example, if the information extracted from a received frame suggests that the year is many years ahead of what the timekeeping device has been assuming for a long time, it is likely that the reception is in error and should be disregarded.

On a finer scale, when the correlation operation that makes use of the known barker code in the received signal produces a noisy result (i.e. the correlation peak is closer to the low-correlation results), based on which the timing extraction may be inaccurate, the receiver may apply averaging filtering, wherein the timing extracted from the received signal is weighted against the locally assumed time in the device such that the timing adjustment considers them both instead of being determined based solely on the received signal, as is typically done in existing prior art devices.

A device, such as a wrist-watch, operating in accordance with the present invention, may estimate the extent of drift that is naturally experienced in it by recording and tracking consecutive timing adjustments that are performed over a certain period of time, e.g., the first week of its operation, based on reception of the accurate broadcast. Such drift would typically be the result of the inaccuracy in the frequency at which its crystal oscillator resonates. Note that the actual cause of the inaccuracy in the frequency at which its crystal oscillator resonates is not critical to the invention and is not intended to affect its scope.

The device may provide a warning when the measured drift exceeds a certain threshold, or when there is a clear trend in the drift indicating that its time derivative exceeds a certain slope, possibly as a result of an exhausted battery that needs replacement.

In one embodiment of the present invention, an initial estimate of the timing drift in the device may be based on a measurement result that is performed by sufficiently accurate external test equipment and provided to the device.

The estimate of drift that the device obtains through the use of the more accurate aforementioned resources allows it to perform periodic corrections thanks to which it may rely on more infrequent receptions of the broadcast signal, resulting in reduced energy consumption.

If, for example, the RCC implemented in accordance with the present invention repeatedly extracts timing from the received signal that suggests that it has drifted 1.4 seconds per day, it may assume such drift is experienced during subsequent days and may correct for such predicted drift independently through a simple computation, i.e. without having to receive the broadcast.

If the tolerable timing error in a radio-controlled timekeeping device were defined, for example, as one second, then a prior art device experiencing 1.4 seconds of drift per day would be forced to compensate its timing at least once a day. In contrast, a device operative to perform independent self-compensation, in accordance with the present invention, may comply with this one second limitation on its time drift while employing more infrequent receptions at a rate that is derived from the error in estimating the inherent drift rather than from the magnitude of the drift itself. Errors in the estimation of the time drift may arise from various practical limitations in the device, as well as from variations in it over time, resulting from temperature changes and aging. Consequently, the estimation of the drift, typically being a result of a crystal's frequency error, is assumed to have an error. A bound on that error may be used to determine the highest rate at which the independently compensated timekeeping functionality of the RCC device could drift from the absolute accurate time that it attempts to track.

For example, if the $\epsilon=1.4$ sec timing error (or daily drift) that is actually experienced in the device is estimated at 1.3 sec, representing an estimation error of $\delta=0.1$ sec, then the self-compensation performed in the device in the absence of reception operations will lead to an effective slower timing drift of $\delta=0.1$ sec per day. An estimate of an upper bound $\Delta \geq \delta$, based on the device's familiarity with its practical limitations and/or based on the variance in its successive estimations of the drift $\epsilon$, allow the RCC device to apply a reception strategy that ensures that the limit specified for allowed drift would not be exceeded, while allowing it more infrequent reception. In this example, if the upper bound assumed for the estimation error is $\Delta=0.2$ sec, which is safely above the actual $\delta=0.1$ sec, then the device may apply the strategy of receiving every five days, thereby ensuring that over the course of five days the uncompensated error will not exceed the specified allowed limit of one second. In reality, the maximum uncompensated drift experienced in this device over the course of five days, as a result of its actual estimation error of $\delta=0.1$ sec, would only be $5 \times 0.1=0.5$ sec.

BRIEF DESCRIPTION OF THE DRAWINGS

The invention is herein described, by way of example only, with reference to the accompanying drawings, wherein.

DETAILED DESCRIPTION OF THE INVENTION

Figure 1:
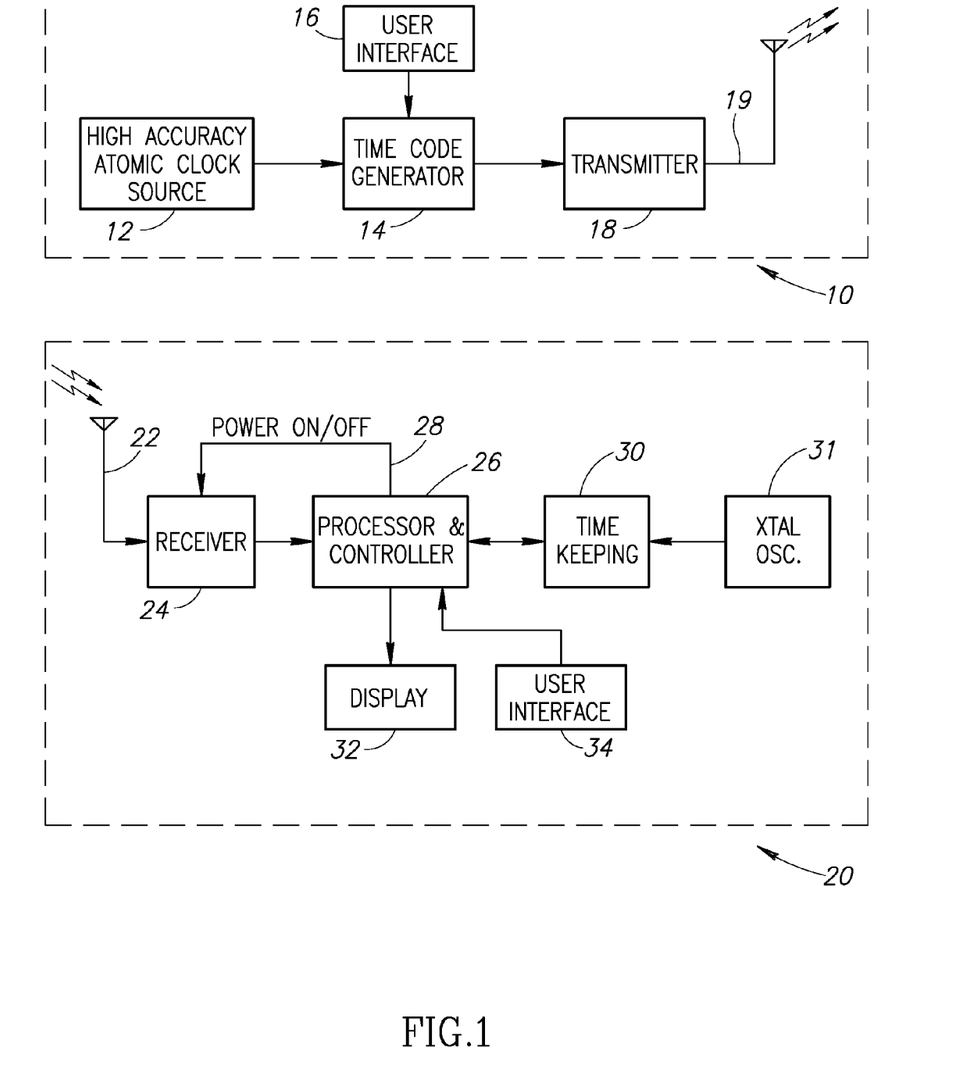
FIG. 1 is a block diagram illustrating an example high-level description of a system operating in accordance with the present invention.

A block diagram illustrating an example high-level description of a system operating in accordance with the present invention is shown in FIG. 1. The equipment at the transmitter end, generally referenced 10, comprises a high accuracy frequency source 12 from which a clock signal is derived, a time-code-generator 14 having user-interface 16, a transmitter 18 and a transmitting antenna 19.

The time code generator 14 keeps track of time based on the high-accuracy frequency source input to it from source 12, constructs the frames of data representing the time information and other information that is to be transmitted, modulates the data frames onto the RF carrier in accordance with the protocol of the present invention and allows time initialization and other controls to be set in it through its user interface 16. The transmitter 18 amplifies the modulated signal to the desired levels, e.g., 50 kW, and drives the antenna 19 that is used for the wide-coverage omnidirectional broadcasting of the signal.

The functions at the receiving end, generally referenced 20 and typically incorporated into a low cost consumer-market product, include receiving antenna 22, receiver 24, processor and controller 26, timekeeping function 30, crystal oscillator 31, display 32 and user interface 34.

The receiver 24 extracts the timing and the information from the received signal, in accordance with the modulation scheme and protocol of the present invention, and provides the processing and control function 26 with the calculated timing error that is derived from a correlation result between the received signal and the known barker code that is used in the frame. The drift calculation and the error estimated in this calculation are established in the processor 26, and the required periodicity for subsequent reception is derived therefrom. Controller function/processor 26, which appropriately enables/disables the operation of the receiver through control line 28 such that it is limited to the intervals of interest to minimize energy consumption in those application where it may be critical to do so (e.g., wrist watches). The timekeeping function 30 keeps track of the time based on pulses provided by crystal oscillator 31, having limited accuracy. The timekeeping may be adjusted by the processor/controller in accordance with the estimated drift at a specific instant, which is either measured or calculated or a combination of the two. The display function 32 may be used to display the time as well as various indications to the user, including reception quality, estimated bound for error in displayed time, battery status, etc. The user interface function 34, based on pushbuttons, slide-switches, a touch-screen, keypad, computer interface, a combination therefrom, or any other form of human interface, may be used to set the initial time, define the maximal allowed timing error, the time-zone according to which time is to be calculated, the use of daylight saving time, etc.

Figure 2:
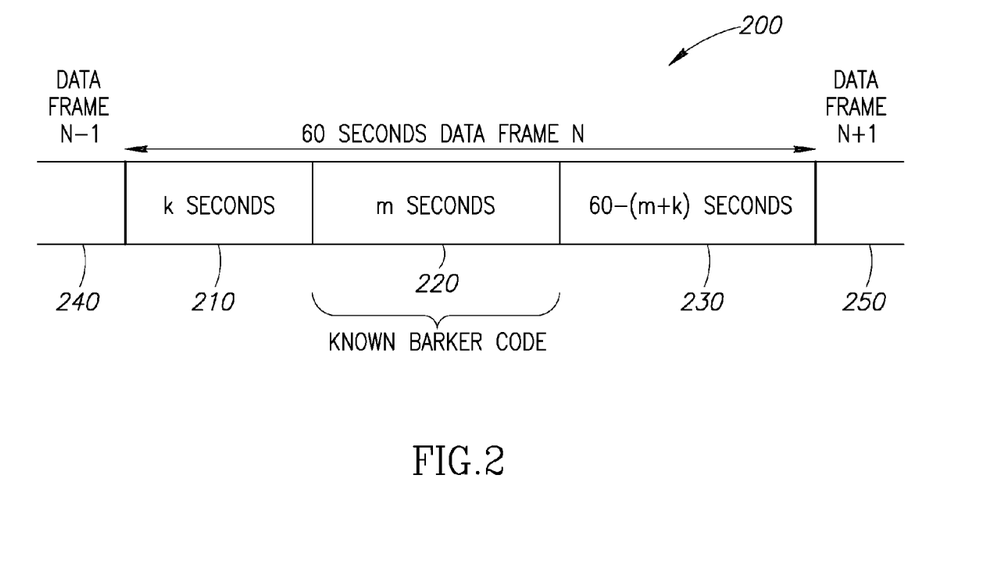
FIG. 2 is a diagram illustrating the general structure of a frame in an example communication protocol.
Figure 3:
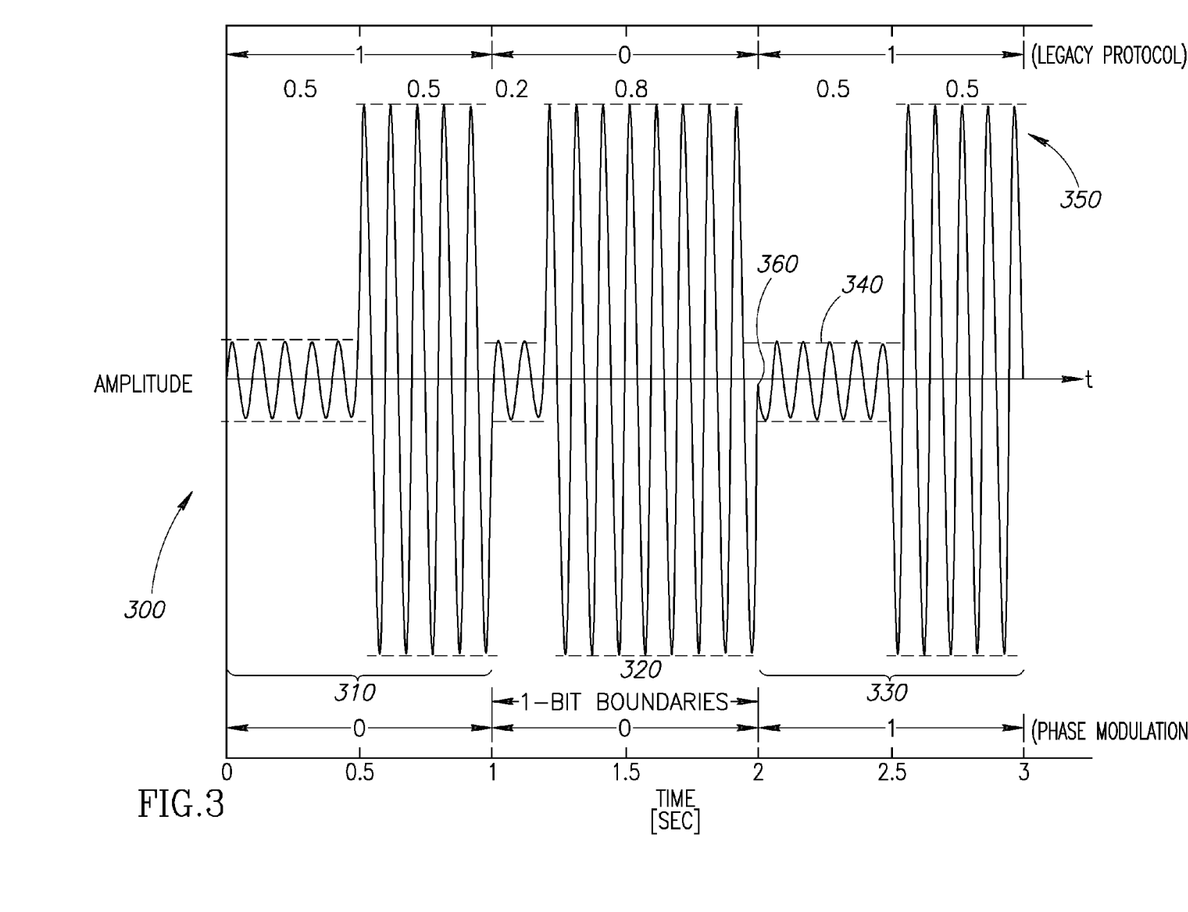
FIG. 3 is a diagram illustrating phase modulation added to an amplitude/phase modulated carrier in an example communication protocol.

A diagram illustrating the general structure of a frame in an example communication protocol is shown in FIG. 2. The frame includes a known barker code at a known timing within the one minute frame of 60 bits that is transmitted every 60 seconds. A diagram illustrating phase modulation added to an amplitude/phase modulated carrier in an example communication protocol is shown in FIG. 3. This diagram describes the amplitude/pulse-width modulation used in the historical WWVB broadcast, as well as the phase-modulation introduced in accordance with the present invention. It is noted that the enhancement in the communication protocol offered by the present invention, in the form of independently defined phase-modulation and the use of a known barker code, is not limited to the broadcast of WWVB and may be applied worldwide, where similar AM/pulse-width schemes are used or where no AM/pulse-width modulation needs to be supported, allowing for continuous BPSK to be used.

A transmitted frame 200 in FIG. 2 comprises a barker code 220 spanning m seconds, a field of information 210 spanning k seconds that precedes the barker code and a field 230 spanning the remaining time 60−(m+k) seconds following the barker code, such that the three fields together span the total of 60 seconds. The values of m and k are preferably fixed and their sum is less than 60, such that the location of the barker code is predictable in a frame, allowing the receiver to search for it at the expected timing, while ignoring the information bits if there is no interest in them.

The $N^{th}$ transmitted frame 200 is preceded by frame N−1 240 and followed by frame N+1 250, both of which span 60 seconds and represent the minute before and the minute after frame N respectively.

FIG. 3 illustrates three consecutive example bits in the transmission as a time-domain waveform 300. The 3-bits, 310, 320 and 330, each span a duration of one second, which is divided into a first portion 340 for which the carrier power is low (−17 dB in WWVB) and a second portion 350 for which the carrier power is high. In the historical WWVB protocol used by the prior art devices, the information in each bit depends on the durations of these two portions with an even 0.5/0.5 sec partition representing a "1", and the uneven 0.2/0.8 sec partition representing a "0". A 0.8/0.2 sec partition represents a 'marker', which may be used for timing identification, but does not carry information.

The modulation of information is added to the existing modulation using BPSK modulation, in accordance with the present invention. A "1" is represented by a carrier having an inverted phase, with the phase inversion 360 occurring at the beginning of the bit as shown for the third bit 330 in FIG. 3 at t=2 sec. While the information represented by the pulse widths is shown to be "1", "0", "1", the information that is sent in parallel, in accordance with the BPSK protocol of the present invention, is shown to be "0", "0", "1". It is noted that the carrier frequency is not shown to scale in the figure to enhance clarity, but it is preferable for the phase transitions to occur at zero crossing instances of the carrier, as would be the case when a bit spans an integer number of carrier cycles, as is the case for WWVB where the carrier frequency is 60 kHz (60,000 cycles per bit).

Figure 4:
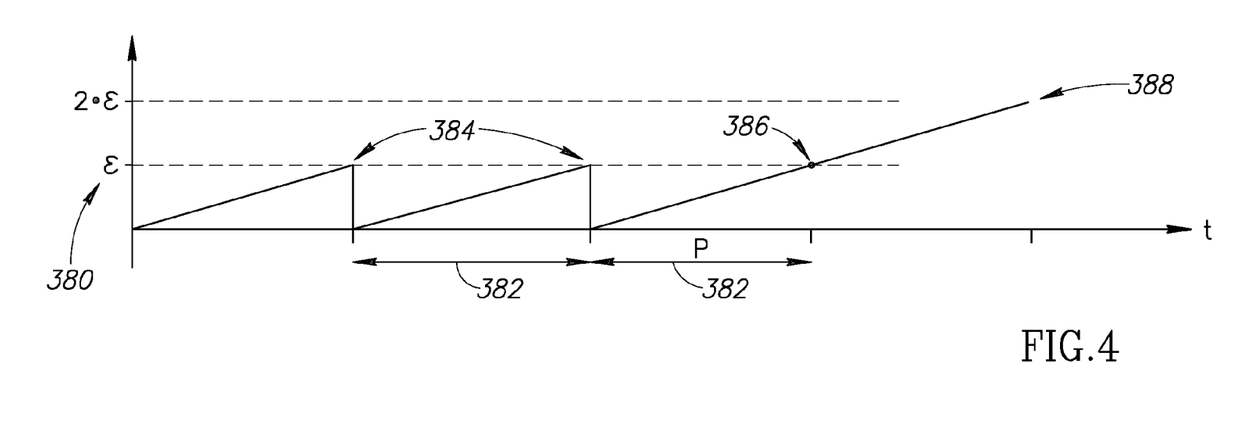
FIG. 4 is a timing diagram illustrating the progression of drift and the instances for performing reception-based timing corrections in one embodiment of the invention.

A timing diagram illustrating the progression of drift and the instances for performing reception-based timing corrections in one embodiment of the invention is shown in FIG. 4. In this figure, the timing drift is experienced in a timekeeping device is shown as a time-domain waveform, generally referenced 380, is shown. A fixed period for reception 382, set, for example, at P=24 hours, is assumed, and two successful reception instances 384 are shown to substantially eliminate an accumulated drift of magnitude $\epsilon$. A failed reception instance 386, however, for which worse SINR conditions may have been experienced, is shown to result in the continued accumulation of drift, up to a point 388, where it is doubled to 2·$\epsilon$, assuming no additional reception attempt was inserted before the next one scheduled at the end of another period P.

Figure 5:
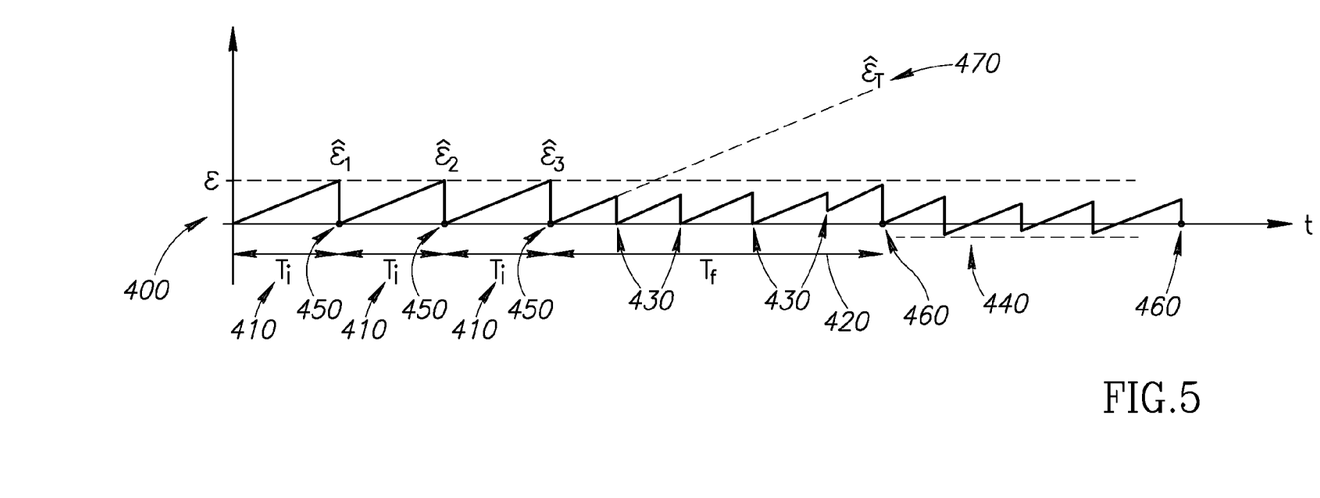
FIG. 5 is a timing diagram illustrating the progression of drift and the instances for performing reception-based timing corrections in another embodiment of the invention.

A timing diagram illustrating the progression of drift and the instances for performing reception-based timing corrections in another embodiment of the invention is shown in FIG. 5. The timing drift that is experienced in this embodiment of the RCC timekeeping device is shown as a time-domain waveform, generally referenced 400, is shown.

Initial periods 410 of duration $P=T_i$ are assumed to be used for the establishment and elimination of drift based on the reception of the broadcast at instances 450. Drift estimates $\hat{\epsilon}_1$, $\hat{\epsilon}_2$, $\hat{\epsilon}_3$ are used to arrive at a drift rate estimate that may be based on their average, while an estimation error, from which an upper bound B is derived, may be established based on the greatest difference between them or their variance. It is appreciated that the use of three estimates is presented here for illustration purposes only and this number may be higher or lower depending on various requirements and constraints that may exist in the particular implementation. While the estimated drift rate is used for the compensation of drift that is experienced at instances 430, where no reception occurs, bound B is used to determine the extended period $P=T_f$ for which reception will occur from this point onwards. The calculated drift compensation at instances 430 is shown to be approximate, resulting in the reduction of drift, contrary to complete elimination of the drift that is theoretically possible at reception instances 460. In the absence of the calculated compensation, within the reception $T_f$, the drift 470 is shown to reach the theoretical value of $\epsilon_T$, for which a maximum allowed drift 440 might be exceeded. The compensation instances 430 may be scheduled arbitrarily, as they do not require reception and are intended to limit the drift experienced in the timekeeping device to below the specified allowed limit, while also providing a smoothened correction, rather than an abrupt one of greater magnitude that would be accumulated after a longer duration.

While the final period $P=T_f$ for the more infrequent receptions is set based on the aforementioned drift related measurements and calculations, the instances 450 may be scheduled according to reception conditions that may be established by trying different times of the day and comparing the measures of reception quality (e.g., SNIR) that are experienced at the different instances. Although various types of interference may exhibit uncorrelated behavior between instances of the same time on different days, the signal level at such instances would typically be correlated. This is because the reception at low frequencies, which are typically used for such systems, is stronger at night, due to the more favorable conditions of the ionosphere, which may be critical for long range operation.

Figure 6A:
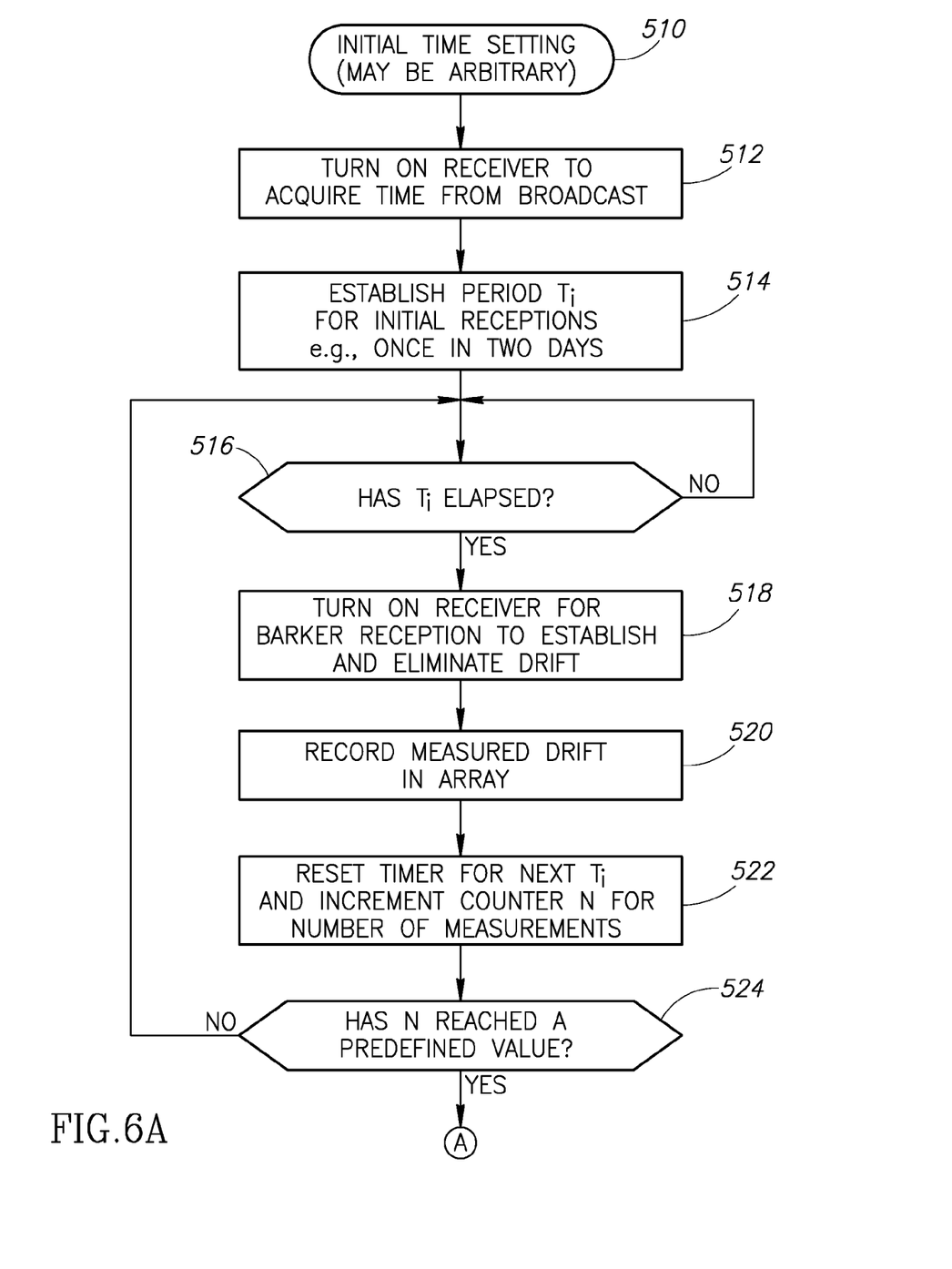
FIG. 6 is a flow diagram illustrating the independent timing correction method of the present invention.
Figure 6B:
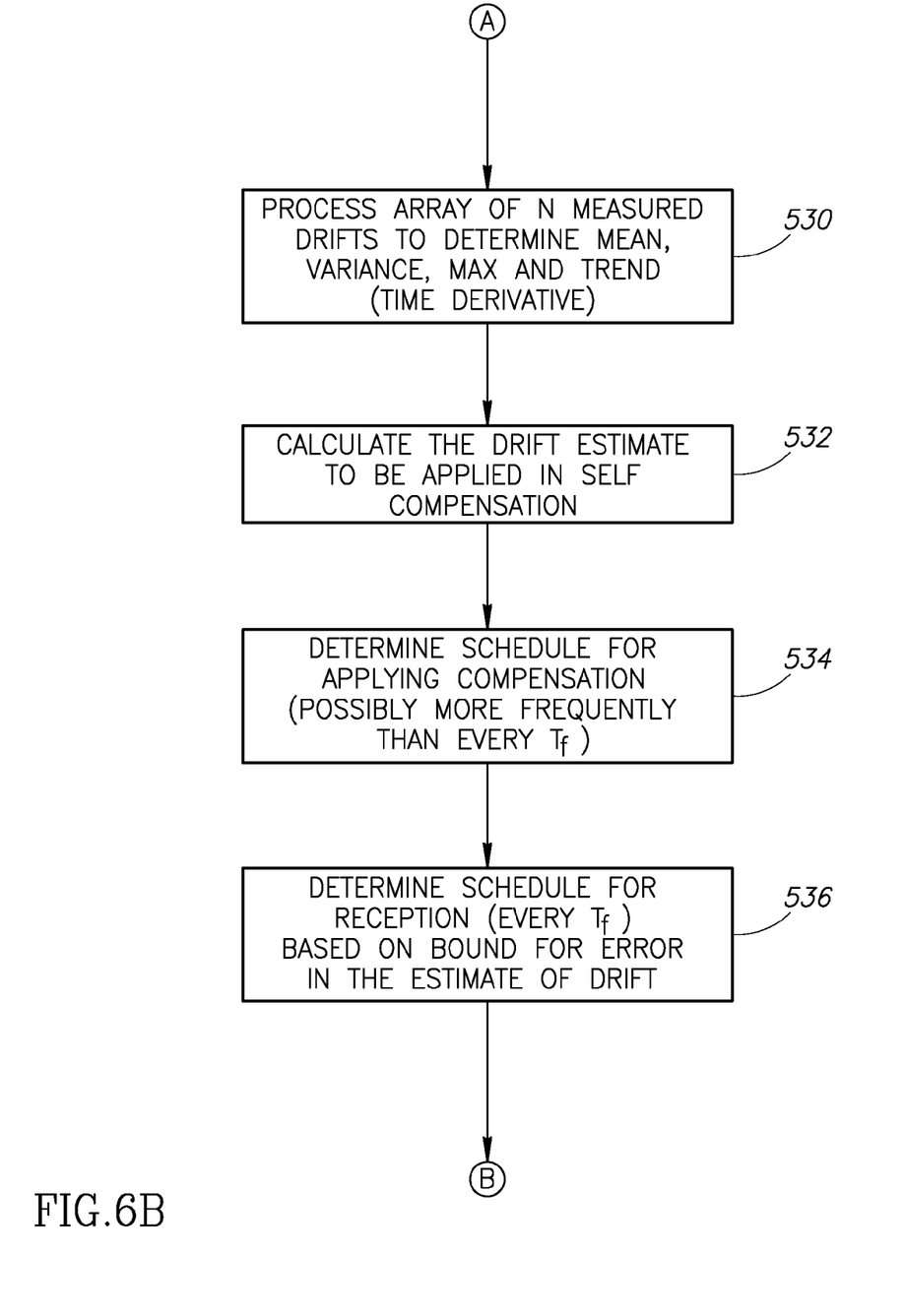
Figure 6C:
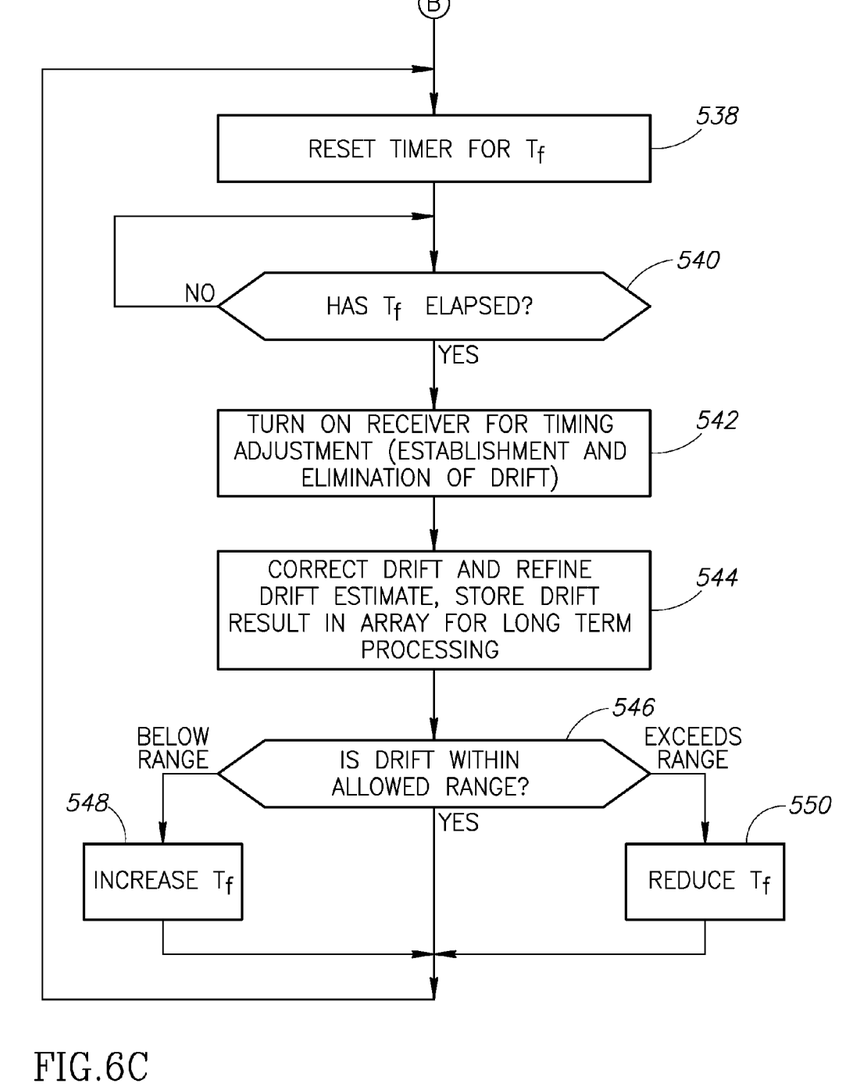

A flow diagram illustrating the independent timing correction method of the present invention is shown in FIG. 6. The method encompasses several key operations in an RCC device. Initially, the device is assumed to be set to an arbitrary time (step 510), requiring the acquisition of the correct time from the received signal (step 512). An initial period $P=T_i$ is then selected for periodic receptions, based on which initial learning of the device's drift will be accomplished (e.g., every two days, or $T_i$=48 hours) (step 514).

Repetitive measurements and correction are then performed. It is checked if the period $T_i$ has elapsed (step 516), and if so, the receiver is turned on to receive the barker reception to establish and eliminate drift (step 518). The measured drift is then recorded in an array (step 520) and the timer is reset for the next $T_i$ and counter N for the number of measurements is incremented (step 522). If N has not yet reached a predefined value, i.e. a certain number N of measurements/drift-estimates reached (step 524), the method loops back to step 516.

Subsequently, the RCC device processes the array of N measured drifts to determine mean, variance, maximum and trend (time derivative) results (step 530). The device then calculates the estimated drift rate to be applied in self-compensation having reasonable accuracy (step 532) and a schedule for applying drift compensations (possibly more frequently than every $T_f$) (step 534). Additionally, a schedule for reception, to occur every $T_f$ is established in step 536 (where $T_f>T_i$, e.g., $T_f=2$ weeks), allowing the reduction in the energy consumed for reception throughout a long period of operation such as a year.

It is noted that the schedule for reception need not be periodic and can be based on randomized or otherwise chosen instances that satisfy the conditions of maximal allowable drift as well as additional conditions that may be defined for the device's operation. The timer for $T_f$ is reset (step 538) once $T_f$ has elapsed (step 540), and the receiver is turned on for a timing adjustment (to establish and eliminate drift) (step 542). The device then corrects its drift and refines its drift estimate and stores the result in an array for long term processing (step 544).

The device then verifies that the drift measured at the reception instances is within a predefined range (step 546). When the drift exceeds the allowed range, the period P for receptions may be reduced (reduce $T_f$) (step 550), whereas when the drift appears much smaller than what is defined as a tolerable range, the period P may be increased (increase $T_f$) (step 548), allowing for further reduction in energy consumption.

A description and explanation for the operation of an example RCC device constructed in accordance with the present invention is hereby provided. If the drift is estimated at 0.25 seconds per day, then regardless of the reception of the time-signal broadcast, the RCC device may correct its timing daily based on this estimate. In the absence of reception for eight days, the device may still self-correct for the accumulated four seconds of drift and will then be capable of searching for the barker code in the received frame while allowing a reduced window for it (reduced time for the receiver to be powered). This self-compensation capability allows it to be more independent, guaranteeing reliable operation over a greater period of time without synchronizing to the broadcast signal, thus allowing lower duty cycle of operation for the receiver, shorter reception windows and consequently overall reduced energy consumption. Such advantage is particularly important in watches, whose energy source is typically a small battery.

What is claimed is:

1. A method of timing correction and drift compensation (compensation for drift) for use in a timekeeping device, said method comprising:
    recording and tracking over time a plurality of timing drift adjustments of said timekeeping device that are made based on a known synchronization sequence received as part of a broadcast frame assumed to represent accurate timing;
    calculating a timing drift rate estimate corresponding to a frequency error in accordance with the plurality of timing drift adjustments performed and the instances at which they were performed; and
    applying timing adjustments to said timekeeping device in accordance with said calculated timing drift rate estimate.

2. The method according to claim 1, wherein said plurality of timing adjustments, made in conjunction with the reception of said known synchronization sequence in a received signal, are performed at instances substantially equally distanced from one another, representing a substantially constant rate of reception.

3. The method according to claim 1, wherein said plurality of timing drift adjustments, made in conjunction with the reception of a known synchronization sequence in a received signal, are performed at instances substantially unequally distanced from one another so as to provide a variable rate of reception based timing drift adjustments.

4. The method according to claim 1, wherein an initial timing rate drift estimate is calculated initially at the time of manufacture.

5. The method according to claim 1, wherein said timing drift estimate is calculated as a function of one or more factors selected from the group consisting of mean, variance, maximum and time derivative trend of the plurality of timing drift rate estimates.

6. The method according to claim 1, wherein said calculated timing drift rate estimate is applied in self-compensation in accordance with a schedule determined so as to yield a reduction in energy consumption.

7. The method according to claim 1, further comprising determining a schedule for reception based on said calculated timing drift rate estimate.

8. The method according to claim 7, further comprising considering one or more factors in determining the schedule for reception.

9. The method according to claim 7, wherein said schedule for reception is based on instances selected to satisfy conditions of maximal allowable drift.

10. The method according to claim 7, further comprising measuring and correcting at each reception instance the actual timing drift established for that instance and revising said timing drift rate estimate based thereon.

11. The method according to claim 10, further comprising reducing the period for reception if the actual timing drift measured exceeds an allowable range.

12. The method according to claim 10, further comprising increasing the period for reception if the actual timing drift measured is below an allowable range, thereby providing a further reduction in energy consumption.

13. The method according to claim 1, wherein timing drift adjustments to said timekeeping device are made using said calculated timing drift rate estimate for a time period determined based on the error in estimating its own timing drift rather than on the magnitude of the drift rate itself, wherein said time period permits less frequent reception than would otherwise be required.

14. The method according to claim 1, further comprising providing an indication when the measured timing drift exceeds a threshold.

15. A method of timing correction for use in a timekeeping device, said method comprising:
  determining an estimated timing drift rate experienced by said timekeeping device by recording and tracking over time a plurality of timing adjustments performed by said timekeeping device based on a synchronization sequence received as part of a broadcast frame;
  performing independent self-compensation of timing drift using said estimated timing drift rate in accordance with a drift compensation schedule; and
  performing receptions in accordance with a reception schedule whereby reception instances occur infrequently at a rate based on an estimate of the error in calculating said estimated timing drift rate and not on the magnitude of the timing drift rate itself.

16. The method according to claim 15, further comprising measuring and correcting at each reception instance the actual instantaneous timing drift and revising said timing drift estimate based thereon.

17. The method according to claim 15, further comprising reducing the period for reception in said reception schedule if the actual timing drift measured exceeds an allowable range.

18. The method according to claim 15, further comprising increasing the period for reception in said reception schedule if the actual timing drift measured is below an allowable range, thereby providing a further reduction in energy consumption.

19. A timekeeping device, comprising:
  a timekeeper circuit operative to keep track of time based on pulses received from a source that may experience a frequency error with respect to its nominal frequency;
  a receiver operative to receive a phase modulated synchronization sequence that is part of a broadcast frame spanning multiple seconds in duration; and
  a processor operative to perform timing adjustments based on said phase modulated synchronization sequence to reduce the required rate of reception instances thereby reducing energy consumption of said timekeeping device.

20. The device according to claim 19, wherein said timekeeping device comprises a watch.

21. The device according to claim 19, wherein said timekeeping device comprises an alarm clock.

22. The device according to claim 19, wherein said timekeeping device comprises a wall mountable clock.

23. The device according to claim 19, wherein said timekeeping device comprises a utility meter.

24. The device according to claim 19, wherein said processor is operative to acquire an initial timing based on the reception of said phase-modulated data frame where coding is employed to allow for the detection and correction of errors.

25. The method according to claim 19, further comprising measuring and correcting at each reception instance the actual timing drift accumulated up to that instance and revising an estimated timing drift rate based thereon.

26. The method according to claim 19, further comprising reducing the period for reception if the actual timing drift measured exceeds an allowable range.

27. The method according to claim 19, further comprising increasing the period for reception if the actual timing drift measured is below an allowable range, thereby providing a further reduction in energy consumption.

28. A timekeeping device, comprising:
  a timekeeper circuit operative to keep track of time based on pulses received from a clock source;
  a receiver operative to receive a phase modulated synchronization sequence that is part of a broadcast frame spanning multiple seconds in duration; and
  a processor operative to:
    perform self-compensation for timing drifts based on one or more measurements of timing errors against timing information obtained from said phase modulated synchronization sequence; and
    perform relatively infrequent reception operations thereby providing reduced energy consumption and increased robustness when reception success is not guaranteed.

29. The timekeeping device according to claim 28, wherein accurate timing information is initially obtained through an external resource.

30. The timekeeping device according to claim 20, wherein the retrieval of information from the broadcast is based on demodulating carrier phase for portions of the transmitted bits.

31. The timekeeping device according to claim 28, further comprising a user interface operative to present a user with an estimated bound for error in displayed time.

32. The timekeeping device according to claim 28, further comprising a user interface operative to receive input from a user indicating an upper bound for allowable error in displayed time.

33. A method for performing self-compensation of a timekeeping device, said method comprising:
- determining an estimate of the timing drift experienced by said timekeeping device during a period of time, corresponding to a drift rate or frequency error; and
- periodically compensating for the amount of drift experienced during said period by adjusting the time maintained by said timekeeping device by an amount in accordance with said timing drift estimate.

34. The method according to claim 33, wherein the timekeeping device compensates for the timing drift estimated to have been experienced during a certain period of time by appropriately adding or subtracting a corresponding portion of said timing drift estimate at fractional points of said period of time thereby smoothening the correction and avoiding it from being noticed by a human user.

35. The method according to claim 33, wherein the period for periodic receptions, performed for the purpose of establishing and compensating for the timing drift of the timekeeping device, is determined based on the magnitude of the timing drift $\epsilon$, estimated based on one or more measurements that rely on the reception of an accurate broadcast signal.

36. The method according to claim 33, wherein the periodicity at which receptions are performed is established based on the estimated error in timing drift measurement and estimation, and on the mean and variability amongst multiple measurements.

37. The method according to claim 33, wherein the periodicity at which receptions are performed is determined based on an upper bound (worst case) error in drift measurements established based on worst case drift measured with additional margin.

38. The method according to claim 33, wherein the periodicity at which receptions are performed take into account one or more factors.

39. The method according to claim 33, further comprising tracking successful reception times during the day and maintaining a sorted confidence list containing the best time to receive the broadcast.

40. The method according to claim 33, further comprising tracking both the absolute value of the time drift and its trend thus allowing for extrapolation of the timing drift trajectory.

41. The method according to claim 33, wherein enhanced reliability in configuring the right time in said timekeeping device is achieved through the use of a time-computing procedure that considers information extracted from a received broadcast frame as well as the time currently maintained in the timekeeping device.

42. The method according to claim 33, further comprising an averaging operation wherein a noisy result of the correlation operation with the received synchronization sequence, based on which the timing extraction may be inaccurate, is weighted against the locally maintained time in the timekeeping device such that the timing adjustment considers them both instead of being determined based only on the received signal.

* * * * *